US012694404B2

(12) United States Patent　　　(10) Patent No.:　US 12,694,404 B2
　　　Zhuge et al.　　　　　　　　　　(45) Date of Patent:　　　Jul. 28, 2026

(54) USING MACHINE LEARNING TO DETECT AND MITIGATE TRANSACTION FRAUD

(71) Applicant: PayPal, Inc., San Jose, CA (US)

(72) Inventors: Wei Zhuge, Shanghai (CN); Yi Han, Shanghai (CN); Chao Chen, Shanghai (CN); Xuexiao Lai, Qinzhou (CN)

(73) Assignee: PAYPAL, INC., San Jose, CA (US)

( * ) Notice: Subject to any disclaimer, the term of this patent is extended or adjusted under 35 U.S.C. 154(b) by 238 days.

(21) Appl. No.: 16/883,795

(22) PCT Filed: May 13, 2020

(86) PCT No.: PCT/CN2020/090030

§ 371 (c)(1),
(2) Date: May 26, 2020

(87) PCT Pub. No.: WO2021/226878

PCT Pub. Date: Nov. 18, 2021

(65) Prior Publication Data

US 2023/0196367 A1　　　Jun. 22, 2023

(51) Int. Cl.
G06Q 20/40　　　(2012.01)
G06Q 30/0201　　　(2023.01)

(52) U.S. Cl.
CPC ..... G06Q 20/4016 (2013.01); G06Q 30/0201 (2013.01)

(58) Field of Classification Search
None
See application file for complete search history.

(56) References Cited

U.S. PATENT DOCUMENTS

| | | | | |
|---|---|---|---|---|
| 11,151,450 B2* | 10/2021 | Zoldi | .................... | G06N 5/045 |
| 11,250,444 B2* | 2/2022 | Yao | .................... | G06F 18/2323 |
| 11,276,023 B1* | 3/2022 | Butler | ............... | G06Q 20/4016 |
| 2011/0225076 A1 | 9/2011 | Wang et al. | | |
| 2014/0351109 A1 | 11/2014 | Peng | | |
| 2019/0378050 A1* | 12/2019 | Edkin | .................... | G06N 20/20 |
| 2022/0374684 A1* | 11/2022 | Syngal | .................. | G06N 3/084 |

FOREIGN PATENT DOCUMENTS

| | | |
|---|---|---|
| CN | 104679777 A | 6/2015 |
| CN | 107481019 A | 12/2017 |
| CN | 110033170 A | 7/2019 |

OTHER PUBLICATIONS

Popat (2nd International Conference on Trends in Electronics and Informatics (ICOEI), "A Survey on Credit Card Fraud Detection using Machine Learning", 2018, pp. 1120-1125).*

* cited by examiner

*Primary Examiner* — Gregory A Pollock

(74) *Attorney, Agent, or Firm* — HAYNES AND BOONE, LLP

(57) ABSTRACT

A plurality of fraud features is determined for a plurality of merchants. A weight matrix is trained for the fraud features. The fraud features are transformed via the weight matrix. An unsupervised machine learning is applied to the transformed fraud features. Based on the unsupervised machine learning, a plurality of tags is generated that correspond to different types of transaction fraud. The merchants are clustered into different merchant groups based on the tags. For each of the merchant groups, a respective decision tree model is trained. Transactions associated with each of the merchant groups are processed using the decision tree model trained for said merchant group.

20 Claims, 9 Drawing Sheets

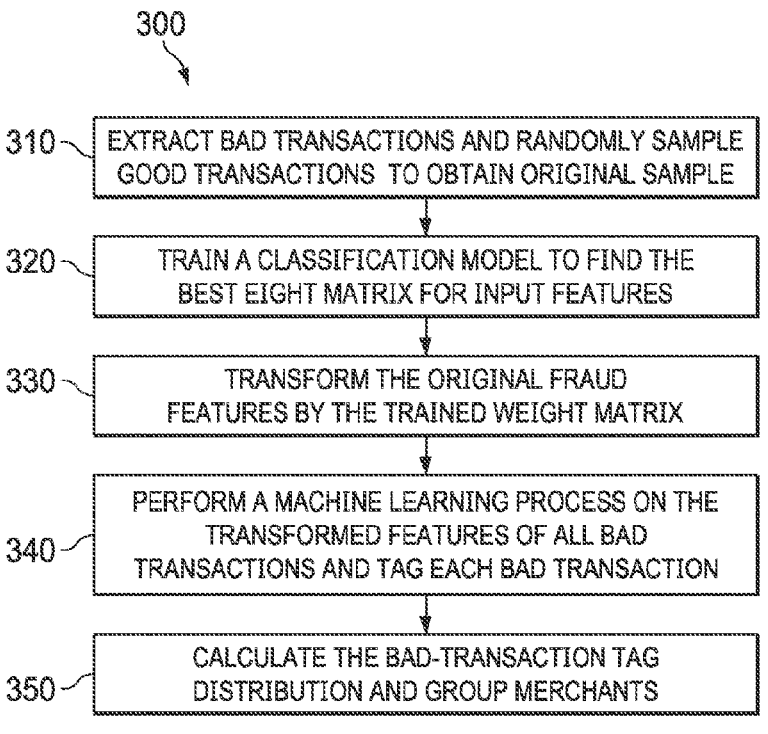

300

310 — EXTRACT BAD TRANSACTIONS AND RANDOMLY SAMPLE GOOD TRANSACTIONS TO OBTAIN ORIGINAL SAMPLE

320 — TRAIN A CLASSIFICATION MODEL TO FIND THE BEST EIGHT MATRIX FOR INPUT FEATURES

330 — TRANSFORM THE ORIGINAL FRAUD FEATURES BY THE TRAINED WEIGHT MATRIX

340 — PERFORM A MACHINE LEARNING PROCESS ON THE TRANSFORMED FEATURES OF ALL BAD TRANSACTIONS AND TAG EACH BAD TRANSACTION

350 — CALCULATE THE BAD-TRANSACTION TAG DISTRIBUTION AND GROUP MERCHANTS

Fig. 3

ORIGINAL FRAUD
FEATURES/VARIABLES

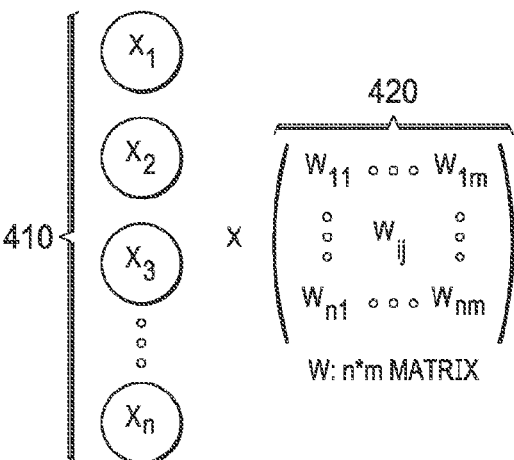

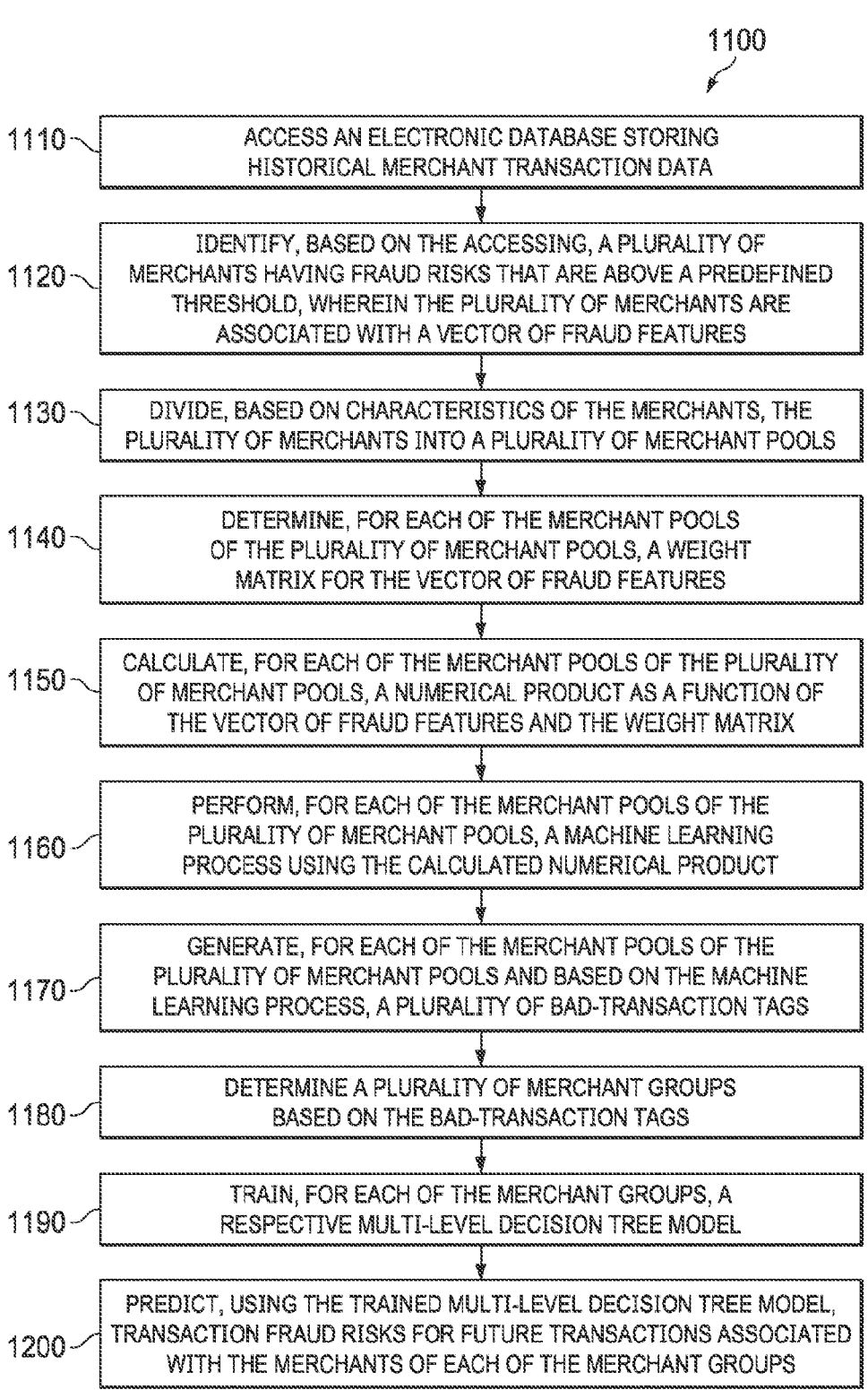

1110 — ACCESS AN ELECTRONIC DATABASE STORING HISTORICAL MERCHANT TRANSACTION DATA

1120 — IDENTIFY, BASED ON THE ACCESSING, A PLURALITY OF MERCHANTS HAVING FRAUD RISKS THAT ARE ABOVE A PREDEFINED THRESHOLD, WHEREIN THE PLURALITY OF MERCHANTS ARE ASSOCIATED WITH A VECTOR OF FRAUD FEATURES

1130 — DIVIDE, BASED ON CHARACTERISTICS OF THE MERCHANTS, THE PLURALITY OF MERCHANTS INTO A PLURALITY OF MERCHANT POOLS

1140 — DETERMINE, FOR EACH OF THE MERCHANT POOLS OF THE PLURALITY OF MERCHANT POOLS, A WEIGHT MATRIX FOR THE VECTOR OF FRAUD FEATURES

1150 — CALCULATE, FOR EACH OF THE MERCHANT POOLS OF THE PLURALITY OF MERCHANT POOLS, A NUMERICAL PRODUCT AS A FUNCTION OF THE VECTOR OF FRAUD FEATURES AND THE WEIGHT MATRIX

1160 — PERFORM, FOR EACH OF THE MERCHANT POOLS OF THE PLURALITY OF MERCHANT POOLS, A MACHINE LEARNING PROCESS USING THE CALCULATED NUMERICAL PRODUCT

1170 — GENERATE, FOR EACH OF THE MERCHANT POOLS OF THE PLURALITY OF MERCHANT POOLS AND BASED ON THE MACHINE LEARNING PROCESS, A PLURALITY OF BAD-TRANSACTION TAGS

1180 — DETERMINE A PLURALITY OF MERCHANT GROUPS BASED ON THE BAD-TRANSACTION TAGS

1190 — TRAIN, FOR EACH OF THE MERCHANT GROUPS, A RESPECTIVE MULTI-LEVEL DECISION TREE MODEL

1200 — PREDICT, USING THE TRAINED MULTI-LEVEL DECISION TREE MODEL, TRANSACTION FRAUD RISKS FOR FUTURE TRANSACTIONS ASSOCIATED WITH THE MERCHANTS OF EACH OF THE MERCHANT GROUPS

Fig. 9

USING MACHINE LEARNING TO DETECT AND MITIGATE TRANSACTION FRAUD

PRIORITY INFORMATION

The present application claims priority to PCT application No. PCT/CN2020/090030, filed on May 13, 2020, entitled "Using Machine Learning to Mitigate Electronic Attacks", the disclosure of which is hereby incorporated by reference in its entirety.

BACKGROUND

Technical Field

The present disclosure generally relates to computer security, and more particularly, to overcoming electronic attacks on networked computer systems.

Related Art

Rapid advances have been made in the past several decades in the fields of computer technology and telecommunications. These advances have led to more and more operations being conducted online, which has attracted the attention of malicious actors. Computer security breaches perpetrated against online entities can be costly, and thus it is important to predict the validity of transactions, so that preventative or remedial measures can be taken. However, conventional computer attack detection and prevention systems have not been able to accurately identify computer systems that are attack targets or provide satisfactory solutions for them, especially due to electronic attacks continuing to change and increase in sophistication.

BRIEF DESCRIPTION OF THE DRAWINGS

FIG. 3 is a flowchart illustrating a clustering process according to various aspects of the present disclosure.

FIG. 4 illustrates the training of a weight matrix according to various aspects of the present disclosure.

FIG. 9 is a flowchart illustrating a method according to various aspects of the present disclosure.

DETAILED DESCRIPTION

Figure 1:
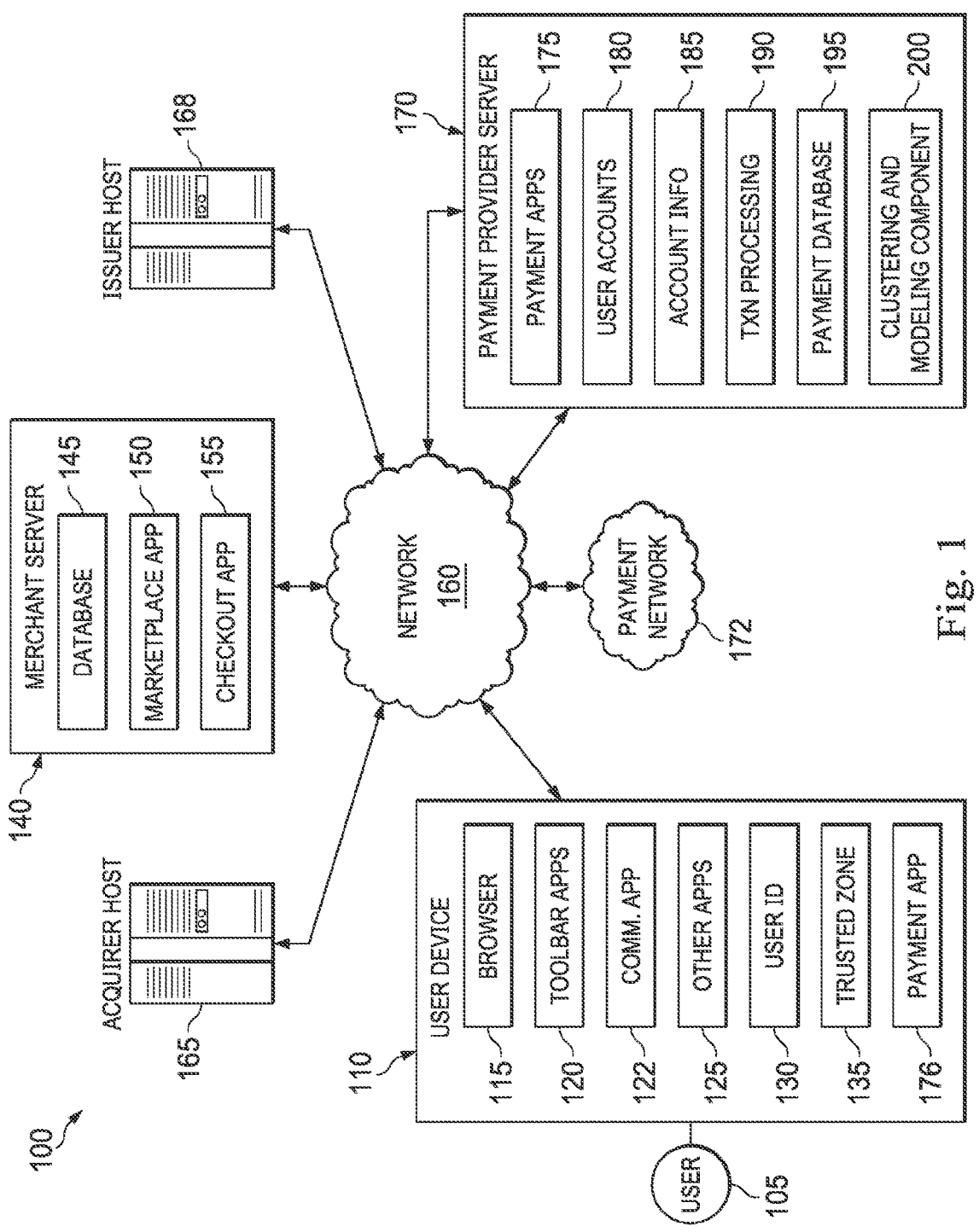
FIG. 1 is a simplified block diagram of a networked system according to various aspects of the present disclosure.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

As computing and communication technologies continue to advance, electronic activities become increasingly more prevalent. For example, more and more people are using the Internet to perform various daily tasks such as banking, buying goods/services, consuming media, paying bills, etc. However, the popularity of online transactions has also led to an increasing number of fraudulent attacks focused on online entities, such as online merchants. For example, a fraudster with malicious intent—such as a carder (e.g., traffickers of credit cards, bank accounts, or other user personal information online)—may discover one or more vulnerabilities of online merchants (e.g., a bug, a weakness, a weakness in the payment method itself, or a security loophole in the merchant's website). After discovering such vulnerabilities, the fraudster may perpetrate fraud such as account takeovers (e.g., falsely assuming a legitimate customer's identity) or stolen financials (e.g., stealing the credit/debit card information of another legitimate customer). Often times, the fraudsters may attack a cluster of merchants that have similar vulnerabilities but may or may not be outwardly similar. Each merchant may also suffer multiple rounds of attacks, but the mode of attacks may not be the same for each round. Making matters worse, not all merchants will report the attacks, which makes it more difficult to identify the underlying trend of attacks. Unfortunately, conventional fraud identification and/or prevention systems have not devised a satisfactory solution to address the above problems.

The present disclosure is directed to systems and methods of using machine learning to provide customized solutions for different merchant groups. First, high-risk merchants (e.g., merchants having certain traits or characteristics or meeting or exceeding certain risk thresholds, which are discussed below) are identified from a general population of merchants. These high-risk merchants are divided into different merchant pools based on their outward characteristics such as size, industry, geographical region, online presence versus offline presence, etc. A machine-learning-based clustering process is then applied to each merchant pool. For example, using a weight matrix, a list of original fraud features associated with the merchants are transformed into weighted new features (also referred to as weighted new feature vectors), which is better suited for machine learning. A machine learning process is applied to the weighted new features and generates tags on various types of bad transactions. These machine-generated tags may not be easily understood by humans or have any intuitive meaning, but each tag reflects a hidden correlation between a type of fraud and a set of underlying conditions/circumstances/characteristics of the merchant.

The merchants are sorted into different clusters based on the machine-generated tags. For example, merchants that share the same dominant machine-generated tags are sorted into the same merchant cluster. For each merchant cluster, a multi-level decision tree model is trained. In an embodiment, a first level decision tree has simpler logic and is trained to have broad coverage (or recall) of bad transactions, whereas a second level decision tree has more complex logic and is trained to have good accuracy in making predictions. In some embodiments, the more complex logic may refer to more tree branches (corresponding to more decisions being made), more computing resources being needed to make the decisions, or more lines of software code in implementing the trees, etc. The trained decision tree will predict, with enhanced accuracy and robustness (compared to conventional systems), which transactions are good and should be accepted and which transactions are bad and should be declined.

As such, the present disclosure describes how to perform preventive and/or mitigating actions, for example by sending warnings to the merchant of a high likelihood of a potential attack, or by temporarily denying transactions that are predicted to be fraudulent.

As summarized above and discussed in more detail below, the present disclosure is integrally tied to specific technology environments (e.g., fraud detection and/or prevention with respect to online transactions). The present disclosure also improves the functionality of a computer at least in part via the implementation and execution of machine-learning algorithms to speedily and effectively predict potential fraud and devise solutions accordingly. The various aspects of the present disclosure will be discussed below in more detail with reference to FIGS. 1-11.

FIG. 1 is a block diagram of a networked system 100 suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or another suitable server-based OS. It can be appreciated that the servers illustrated in FIG. 1 may be deployed in other ways and that the operations performed, and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PAYPAL™, Inc. of San Jose, CA A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that a transaction, as used here, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described here. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and/or services.

Still referring to FIG. 1, the user device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed here.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

In conjunction with user identifiers 130, user device 110 may also include a trusted zone 135 owned or provisioned by the payment service provider with agreement from a device manufacturer. The trusted zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

User device 110 may install and execute a payment application 176 received from the payment service provider to facilitate payment processes. The payment application 176 may be executed on the user device 110 either as a standalone application, or within the browser 115. The payment application 176 may allow a user to send payment transaction requests to the payment service provider 170, which includes communication of data or information needed to complete the request, such as funding source information.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 160 to browser 115 and/or to the payment application 176 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described here. As such, transaction processing application 190 may store details of an order from individual users, including funding source used, credit options available, etc. Payment application 175 may be further configured to determine the existence of and to manage accounts for user 105, as well as create new accounts if necessary.

According to various aspects of the present disclosure, the payment provider server 170 may also include a clustering and modeling component 200. The clustering and modeling component 200 is configured to perform the merchant clustering and decision tree modeling processes of the present disclosure, which will be discussed below with reference to FIGS. 2-11. The clustering and modeling component 200 may include computer code configured to perform the various processes and steps discussed below (e.g., machine learning) and hardware memory for storing the computer code and/or electronic processors for executing the computer code.

It is understood that although the embodiment of FIG. 1 illustrates the clustering and modeling component 200 as residing on the payment provider server 170, this is not intended to be limiting. In some embodiments, the clustering and modeling component 200 (or a similar tool) may be implemented on a computer of the acquirer host 165 or on a computer the issuer host 168 as well. In other embodiments, the clustering and modeling component 200 may be divided in parts, with some parts being implemented on the payment provider server 170, while other parts are implemented on the merchant server 140 and/or the acquirer host 165 or issuer host 168. Furthermore, although the clustering and modeling component 200 is illustrated as being separate from the transaction processing application 190 in the embodiment shown in FIG. 1, the transaction processing application 190 may implement some, or all, of the functionalities of the clustering and modeling component 200 in other embodiments. In other words, the clustering and modeling component 200 may be integrated within the transaction processing application 190 in some embodiments. The features and functionalities of the clustering and modeling component 200 will be discussed later in more detail with reference to FIGS. 2-11.

Still referring to FIG. 1, the payment network 172 may be operated by payment card service providers or card associations, such as DISCOVER™, VISA™, MASTER-CARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 2:
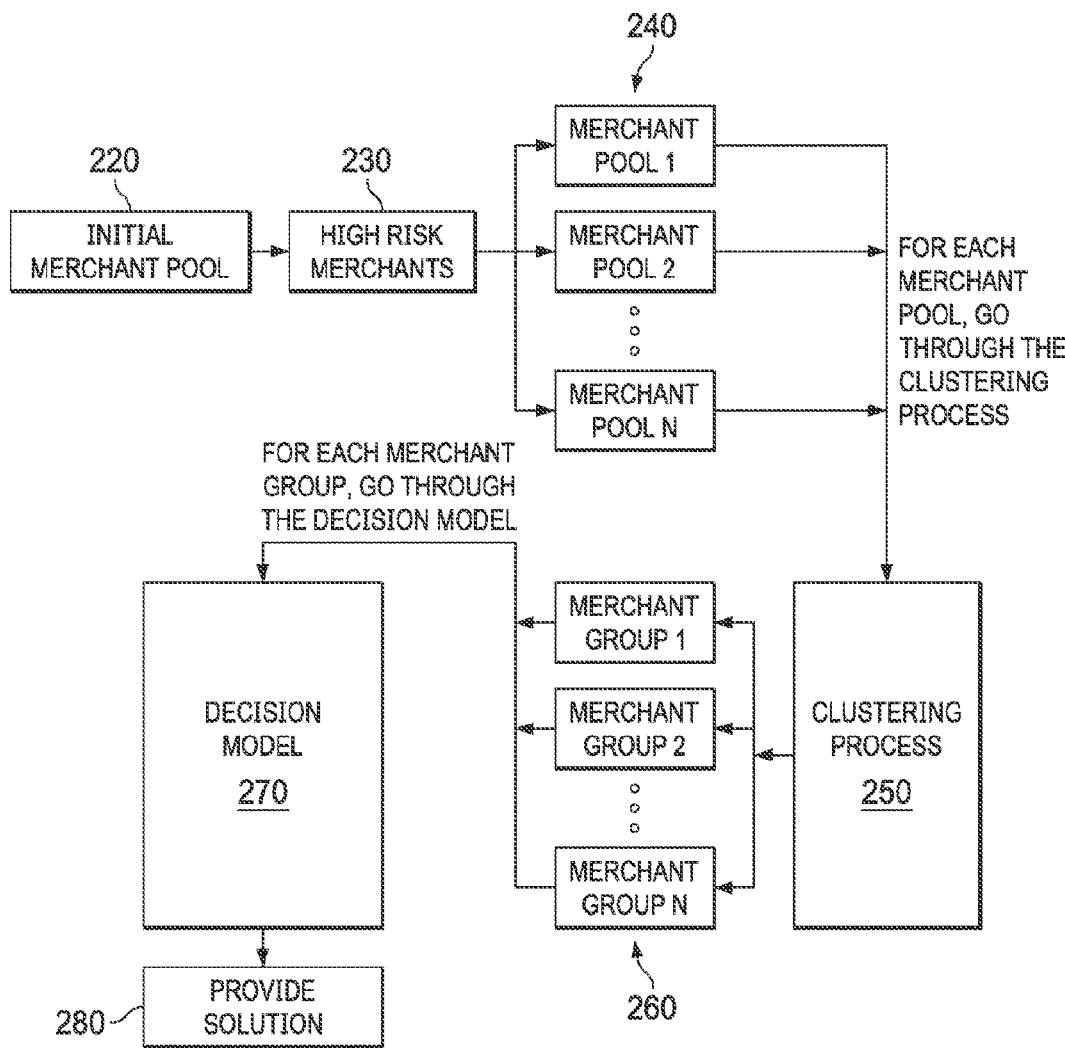
FIG. 2 is a block diagram that illustrates a process flow according to various aspects of the present disclosure.

FIG. 2 is a simplified block diagram illustrating a process flow according to the various aspects of the present disclosure. First, an initial merchant pool 220 is accessed. The initial merchant pool 220 may be a general merchant pool and may include all merchants whose electronic records (e.g., containing characteristics of the merchant and transaction data) are available for access. The merchants in the initial merchant pool 220 may include merchants that are at low risk of being attacked by malicious actors as well as merchants that are vulnerable or prone to being attacked by malicious actors. In some embodiments, the data associated with the initial merchant pool 220 may be retrieved from an electronic database, for example from the payment database 195 of FIG. 1. Note that FIG. 2 will be explained in more detail below also with reference to FIGS. 2-7.

The present disclosure then identifies the high-risk merchants 230 from the initial merchant pool 220. As a subset of the general initial merchant pool 220, the high-risk merchants 230 may include merchants that have known vulnerabilities or security issues. The high-risk merchants 230 may also include merchants that have historically been attacked at a high rate (e.g., more than X number times per year or per month over the past Y number of years), or merchants that have recently experienced a sudden increase in attacks (e.g., an increase of Z % over the past month, week, or day), or merchants whose attacks are more severe (e.g., a greater monetary amount of damage, or longer down time, etc.). As such, the high-risk merchants 230 may be associated with a great number of bad transactions, for example transactions perpetrated by malicious actors and that are fraudulent in nature.

In some embodiments, the high-risk merchants 230 may be identified based on a fraud score. For example, all the merchants in the initial merchant pool 220 may have a respective fraud score, which may be calculated based on various factors such as number of attacks experienced in a predefined period of time (e.g., the past year), the transaction amounts related to the fraud attacks, the known vulnerabilities or security loopholes, etc. If a particular merchant's fraud score exceeds a predefined threshold, that merchant may be deemed one of the high-risk merchants 230.

The high-risk merchants 230 are then divided into a plurality of merchant pools 240, for example merchant pool 1, merchant pool 2, . . . and merchant pool N as shown in FIG. 2. The division may be based on various characteristics or properties of the merchants, which may include the geographical regions (e.g., North America, Asia, Europe, etc.) of the merchants, the industries and/or segments of the merchants (e.g., consumer electronics, clothing, media, automotive, etc.), the type of merchants (e.g., brick and mortar, online only, or a combination of both), or even the risk level of being attacked (e.g., high level, medium level, or low level), etc.

A clustering process 250 is then performed for each merchant pool of the merchant pools 240. The clustering process 250 may be performed by the clustering and modeling component 200 of FIG. 1 and may include several steps. In an embodiment, the steps of the clustering process 250 are illustrated as a flowchart in FIG. 3. In a step 310 of the clustering process 250, all the past bad transactions (e.g., known to involve fraud, such as stolen financials or account takeovers) are extracted from all the merchants in a specific merchant pool (e.g., merchant pool 1) that is undergoing the clustering process. In addition to the bad transactions, the step 310 also randomly samples a number of past good transactions (e.g., known to be free of fraud). The total number of good and bad transactions constitute an original sample. In some embodiments, the randomly sampled number of good transactions is approximately equal to the number of bad transactions. For example, if the total number of bad transactions is 1000, then 1000 good transactions are also sampled, thereby yielding a total number of 2000 transactions. However, it is understood that the percentage split between the bad transactions and good transactions need not necessarily be 50%/50%. In various embodiments, the percentage of good transactions may exceed 50% by a first predefined amount or may be less than 50% by a second predefined amount, as long as the percentage of bad transactions in the original sample is sufficient for proper weights to be assigned in the subsequent steps discussed below.

In a step 320 of the clustering process 250, a classification model is trained to find the best weight matrix for input features. This step 320 is visually illustrated in FIG. 4, which shows an example vector of original fraud features 410, an example weight matrix 420, and an example output probability 430. As examples, the original fraud features 410 may include user login credentials, a transaction amount, a physical address associated with the transaction, a phone number associated with the transaction, an email address associated with the transaction, a domain name of the email address, a user name of the email address, an Internet Protocol (IP) address from which the transaction originated, the type of goods purchased, etc.

Note that the fraud features listed here do not represent an exhaustive list, and there may be hundreds of other fraud features. It is also understood that the original fraud features 410 themselves do not necessarily indicate the presence or occurrence of fraud. Rather, the original fraud features 410 are variables, for which a value may be assigned for a merchant and/or for a transaction. For example, an IP address may be one of the fraud features, and a particular value of the IP address (e.g., 162.43.67.13) that has previously been linked to fraudulent transactions may have a higher risk score than other IP addresses that have never been linked to fraudulent transactions in the past.

As shown in FIG. 4, the original fraud features 410 may be in a vector form, for example as a one-dimensional n*1 vector including an n number of components $X_1$, $X_2$, $X_3$ . . . through $X_n$, where each component represents one of the original fraud features. For example, $X_1$ may represent a transaction amount, and $X_2$ may represent an IP address, etc. Meanwhile, the weight matrix 420 is made up of n number of rows and m number of columns of components. Each component (e.g., $W_{11}$ or $W_{nm}$) of the weight matrix 420 may be a number, for example a coefficient. The n number of rows is equal to the n number of components of the vector of fraud features 410. The m number of columns is equal to the number of different types of bad and good transactions. For example, the first column (e.g., $W_{11}$ through $W_{n1}$) corresponds to bad transactions that are account-take-overs (ATO), the second column (e.g., $W_{12}$ through $W_{n2}$) corresponds to bad transactions that are stolen-financials (SF), and the third column (e.g., $W_{1m}$ through $W_{nm}$) corresponds to good transactions (e.g., free of fraud). Therefore, m=3 in this simple example. Generally, m is the number of different types of bad transactions plus the number of types of good transactions. The number of types of good transactions is typically equal to 1, since all the transactions that are not bad transactions are considered good transactions, hence one type of good transactions.

According to the step 320 of the clustering process 250, the original fraud features 410 are multiplied by the weight matrix 420. In some embodiments, the step 320 determines the values of weight matrix 420 based on a gradient descent method. In some embodiments, the gradient descent method may obtain the best weight matrix 420 without multiplying it by the original fraud features 410.

In the end, the best weight matrix (obtained using the gradient descent method) is selected as the weight matrix to be used for subsequent steps of the clustering process 250. As coefficients of the original fraud features 410, the values of the trained (e.g., most optimal) weight matrix indicate which fraud features of the original fraud features 410 play a more dominant or less dominant role in influencing the output, for example in causing fraud in this case. For ease of reference, this trained weight matrix may still be labeled by the reference numeral 420 in the present disclosure.

In a step 330 of the clustering process 250, the original fraud features 410 are transformed by the trained weight matrix 420. In more detail, as a first sub-step of the step 330, an n×1 vector (e.g., containing n rows and 1 column, just like the vector of the original fraud features 410) is generated from the trained weight matrix 420. This may be done by averaging the values of each row of the trained weight matrix. For example, the first row ($W_{11}$ through $W_{1m}$) of the trained weight matrix 420 is averaged by adding the values of the components $W_{11}$ through $W_{1m}$, and then dividing the sum by m (since there are m number of components in each row). The result (e.g., the average of the first row) is the first component of the n×1 vector. Similarly, the rest of the rows of the weight matrix 420 is averaged to obtain the remaining components of the n×1 vector.

For ease of reference, the vector corresponding to the original fraud features 410 may be represented by X, and the vector corresponding to the averaged values of the weight matrix 420 may be represented by W. In some embodiments, only the bad transactions are kept, for example by removing the good transactions. For each bad transaction, weighted new features is obtained based on the vectors X and W. In that regard, the weighted new features is a binary operation that takes two matrices of the same dimensions and produces another matrix of the same dimension as the operands where each element i, j is the product of elements i, j of the original two matrices. In this case, since the vectors X and W have the same dimensions (e.g., they are both n×1 vectors, or 1-dimensional matrices), the weighted new features can be generated using the vectors X and W. The weighted new features may also be referred to as the transformed features. Alternatively stated, the original fraud features 410 may be transformed using the averaged values of the weight matrix 420 to obtain weighted new features as a result of the transformation. According to the various aspects of the present disclosure, the weighted new features is better suited for machine learning than the conventional labels for bad transactions (e.g., ATO or SF) or the original fraud features 410. For example, the new feature vectors transformed from the original fraud features help correct feature vectors by adding weights based on their importance to distinguish bad transactions from good transactions. Therefore, they are better suited for the machine learning to be performed subsequently.

In a step 340 of the clustering process 250, a machine learning process is performed on the transformed features (e.g., on the weighted new features) of all the bad transactions, and each of the bad transactions is tagged or labeled accordingly. In some embodiments, the machine learning process is an unsupervised machine learning process. The unsupervised machine learning process learns the correlation between the transformed fraud features (e.g., the weighted new features obtained from step 330) and the bad transactions (e.g., transactions with ATO or SF).

As a result of the machine learning process, a plurality of new different bad-transaction tags (also interchangeably referred to as bad-transaction clusters hereinafter) may be machine generated. For example, a respective bad-transaction tag is generated for each bad transaction. These machine-generated bad-transaction tags may not have any intuitive meaning that is easily understood by humans. Rather, these machine-generated bad-transaction tags may correspond to hidden correlations between fraud and specific combinations and/or values of fraud features. For example, a machine-generated bad-transaction tag BT1 may indicate that fraud is likely to occur for high speed transactions (e.g., 1000 transactions in the past 24 hours) during a specific time interval (e.g., the week before Christmas). As another example, a machine-generated bad-transaction tag BT2 may indicate that fraud is likely to occur when a transaction originates from a particular IP address or a particular range of IP addresses. These underlying correlations between fraud and different scenarios of fraud features would have been very difficult for humans or other conventional computer-implemented methods to identify. In other words, they may be hidden to humans and/or conventional computer-implemented methods. However, the weighted new features transformation of the original fraud features 410 and the subsequent machine learning makes the identification of such underlying but hidden correlations possible according to the present disclosure.

After the performance of the step 340, for each bad transaction that was previously tagged with ATO or SF (or another suitable conventional bad-transaction tag), such a bad transaction may now have a plurality of machine-generated bad-transaction tags, for example BT1, BT2, BT3, . . . BTN, each of which may indicate a specific set of circumstances and/or conditions that are correlated with fraud. Since the good transactions are excluded from the machine learning process of 340, the machine-generated tags are not applied to the good transactions.

In a step 350 of the clustering process 300, the bad-transaction tag distribution is calculated. In some embodiments, the bad transactions distribution (e.g., in terms of percentage) is based on monetary amounts. In other embodiments, the bad transaction distribution may be based on the volume or number of transactions. In any case, according to the calculated bad transaction distribution, the merchants are grouped accordingly. For example, for a merchant 1, 60% of its bad transactions are tagged with the BT1 bad-transaction tag, 20% of its bad transactions are tagged with the BT2 bad-transaction tag, 10% of its bad transactions are tagged with the BT3 bad-transaction tag, and 10% of its bad transactions are tagged with the BT4 bad-transaction tag. As such, the bad-transaction tag BT1 is a dominant tag (e.g., since it constitutes more than 50% of the distribution) for merchant 1, and the merchant 1 may be clustered into a merchant group corresponding to the bad-transaction tag BT1. As another example, for a merchant 2, 20% of its bad transactions are tagged with the BT1 bad-transaction tag, 70% of its bad transactions are tagged with the BT2 bad-transaction tag, 7% of its bad transactions are tagged with the BT3 bad-transaction tag, and 3% of its bad transactions are tagged with the BT4 bad-transaction tag. As such, the bad-transaction tag BT2 is a dominant tag for merchant 2, and the merchant 2 may be clustered into a merchant group corresponding to the bad-transaction tag BT2. As a further example, for a merchant 3, 55% of its bad transactions are tagged with the BT1 bad-transaction tag, 10% of its bad transactions are tagged with the BT2 bad-transaction tag, 15% of its bad transactions are tagged with the BT3 bad-transaction tag, and 20% of its bad transactions are tagged with the BT4 bad-transaction tag. As such, the bad-transaction tag BT1 is a dominant tag for merchant 3, and the merchant 3 may be clustered into a merchant group corresponding to the bad-transaction tag BT1.

For some merchants, however, there may not be a single dominant bad-transaction tag. For example, for a merchant 4, 25% of its bad transactions are tagged with the BT1 bad-transaction tag, 25% of its bad transactions are tagged with the BT2 bad-transaction tag, 30% of its bad transactions are tagged with the BT3 bad-transaction tag, and 20% of its bad transactions are tagged with the BT4 bad-transaction tag. As such, there are no dominant bad-transaction tags for merchant 4. For the merchants that do not have a dominant bad-transaction tag, a machine learning process such as a K-means clustering process may be applied to the distribution of these merchants. Essentially, the K-means clustering process reveals which merchant group is the most similar to the merchant that does not have a dominant bad-transaction tag. For example, the K-means clustering process may indicate that, while the merchant 4 discussed above lacks a dominant bad-transaction tag, it is the most similar to merchant 1, which belongs to the merchant group with the bad-transaction tag BT1. Hence, the merchant 4 may also be grouped into the merchant group with the bad-transaction tag BT1.

Figure 5:
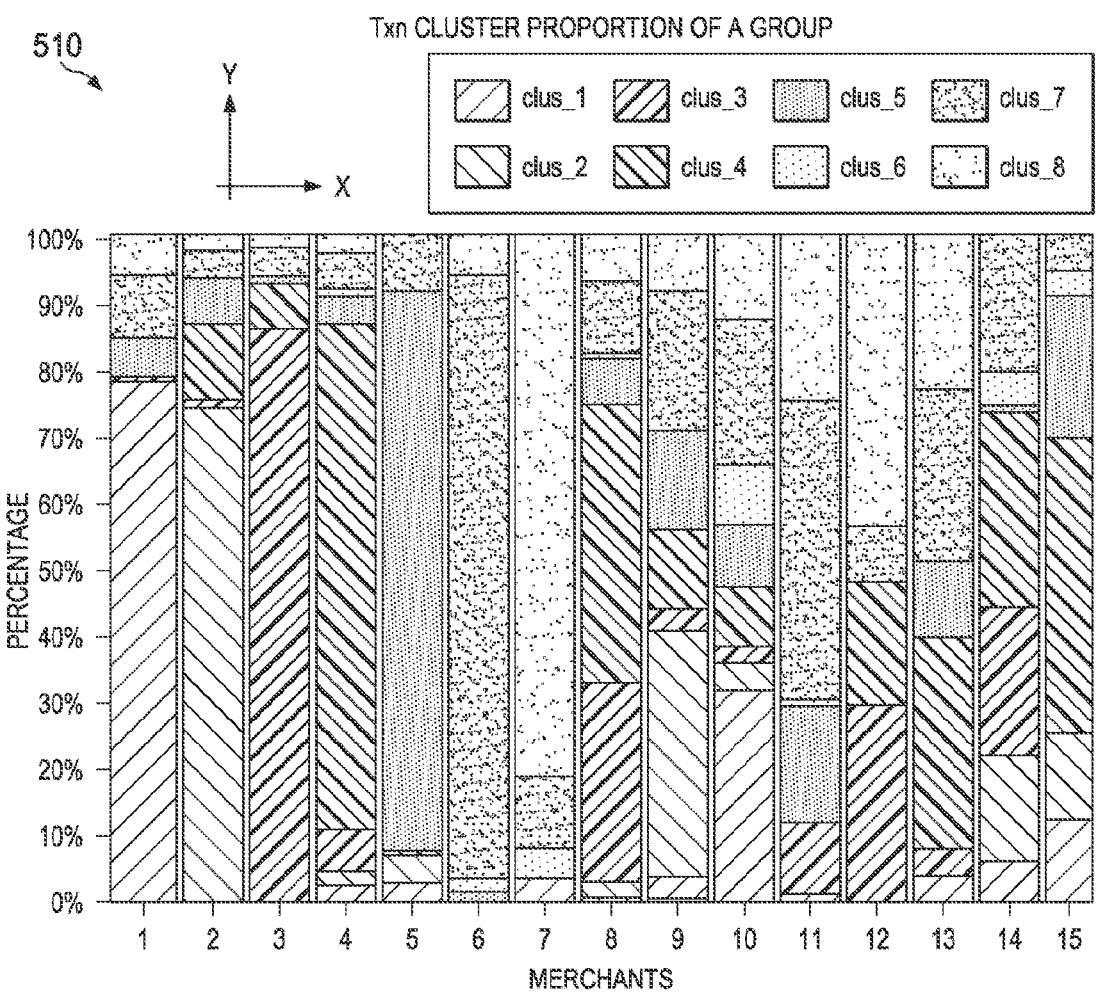
FIG. 5 is a graph illustrating an example cluster distribution of merchants according to various aspects of the present disclosure.

FIG. 5 contains a graph 510 that provides a visual illustration of the merchant clustering. For example, an X-axis of the graph 510 represents a number of different merchant groups (e.g., 15 different merchant groups in this case), not individual merchants. The Y-axis of the graph 510 represents the percentage distribution of the bad-tag transactions, which are also interchangeably referred to as clusters here. The bad transactions of each merchant group may be tagged with eight different example bad-transaction tags clus_1, clus_2, clus_3, clus_4, clus_5, clus_6, clus_7, or clus_8. Note that the bad-transaction tags clus_1, clus_2, clus_3, clus_4, clus_5, clus_6, clus_7, or clus_8 have the same type of meaning as the bad-transaction tags BT1, BT2, etc. The numeral (1, 2, 3 . . . ) after the "clus" corresponds to the merchant group number. Based on the example of FIG. 5, the dominant cluster of merchant group 1 is clus_1 (accounting for about 78% of the transactions), the dominant cluster of merchant group 2 is clus_2 (accounting for about 75% of the transactions), the dominant cluster of merchant group 3 is clus_3 (accounting for about 85% of the transactions), so on and so forth.

Some of the merchant groups, such as merchant group 14, may not have a dominant cluster. As such, a machine learning process such as K-means may be applied to the distributions of merchant group 14 to determine which merchant group it is most similar to, and it may be grouped with that merchant group accordingly. For example, the K-means process may determine that merchant group 14 may be the most similar to merchant group 4, where cluster 4 is the most dominant cluster. As such, merchant group 14 and merchant group 4 may be clustered together under the same bad-transaction tag clus_4.

Referring back to FIG. 2, using at least in part the machine learning process discussed above, the clustering process 250 generates a plurality of merchant groups 260, for example merchant group 1, merchant group 2, through merchant group N. Again, these merchant groups 1, 2 . . . N correspond to the numbers listed in the X-axis in FIG. 5. As discussed above, each merchant group contains merchants that share a common (or the same) bad-transaction tag, or the same clustering label. For example, merchant group 1 includes merchants whose dominant bad-transaction tag is BT1, merchant group 2 includes merchants whose dominant bad-transaction tag is BT2, and merchant group 3 includes merchants whose dominant bad-transaction tag is BT5, etc. Again, a merchant that lacks a dominant bad-transaction tag may also be grouped into a merchant group where a majority of the merchants are the most similar to the merchant lacking the dominant bad-transaction tag, based on the application of the machine learning process such as K-means.

In some implementations, the merchant groups 260 may be the sub groups of the merchant pools 240. Whereas the merchant pools 240 are classified based on outward merchant characteristics such as geographical region, industry, or risk, the merchant groups 260 are generated based on the application of the clustering process 250 discussed above. Thus, the merchants in the same merchant group (e.g., in merchant group 1) may come from the same merchant pools 240, but they are grouped together because they share underlying similarities correlated to fraud. These similarities were not readily apparent before the application of the clustering process, but they have now been revealed based on the machine learning process applied to the weighted new features vector (e.g., the transformed fraud features), as discussed above with reference to FIGS. 3-4.

Still referring to FIG. 2, a decision model 270 is applied to each merchant group of the merchant groups 260. The application of the decision model 270 may be performed by the clustering and modeling component 200 of FIG. 1 and may include several steps. In an embodiment, the steps of the application of the decision model 270 are illustrated as method 600 in a flowchart shown in FIG. 6. In a step 610 of the method 600, a time weight is assigned to each training sample of the decision tree model. For example, for a particular time period (e.g., the past year), the time stamps are obtained for all the transactions (including good transactions and bad transactions) in the merchant pool that is undergoing the decision model 270. The time stamps indicate the date and time in which the transactions were conducted. The transactions are then sorted in a chronological order based on the time stamps.

A time weight is assigned to each transaction, where the more recent transactions are assigned greater time weights. This is because fraud trends could change fast. As such, more recent transactions may have more important information in terms of determining fraud. Accordingly, the more recent transactions are weighted more in the training samples. In some embodiments, the time weight is calculated as follows:

$$\text{weight}_t = cf * t, \text{ where } t \in \mathbb{Z}: \left[1, \left\lceil \frac{a}{b} \right\rceil\right]$$

where $\text{weight}_t$ represents the time weight, cf is a constant (e.g., 0.1), a represents the range of the date sequence, and b represents the defined time range. As an example, suppose that the entire transaction data extracted for a decision was during the last 30 days. As such, a=30. We may then divide the 30 days into 5 parts, such that each part has 6 days. As such, b=6. Assume that cf=0.1, we then get a series Z:[1,5] assigned to each of the 6-day parts. Naming the first day of the 30 days "d1", then the weight of d1-d6 is 0.1*1=0.1, weight of d7-d12 is 0.1*2=0.2. The most recent 6 days have a weight of 0.5.

Figure 7:
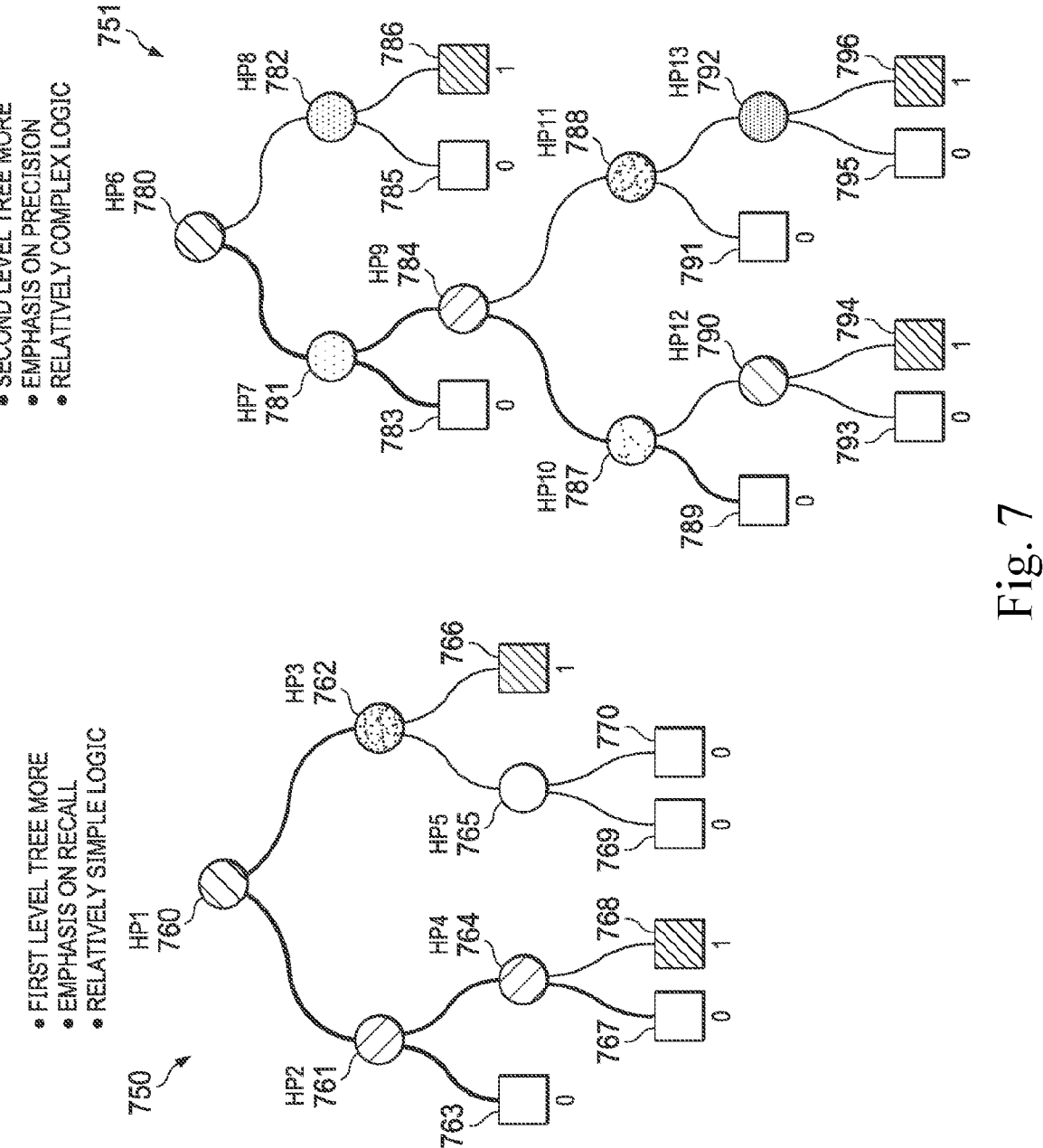
FIG. 7 visually illustrates an example decision tree model according to various aspects of the present disclosure.

As a step 620 of the method 600, a multi-level tree search process is performed to train a decision tree model. An embodiment of this is shown in FIG. 7, which includes a first level tree 750 and a second level tree 751. The tree 750 includes a plurality of nodes, for example nodes 760-770. The tree 751 includes a plurality of nodes, for example nodes 780-796. The node 760 at the top of the tree 750 is the input for the tree model, and it represents all the transactions (good and bad) for the particular merchant pool that is undergoing the decision tree modeling process.

The node 760 is then split into two branches based on a value of a hyperparameter. Generally, a hyperparameter refers to settings of an algorithm that can be adjusted to optimize performance. In a machine learning process, hyperparameters are set before training. In the case of a decision tree machine learning process (e.g., a random forest process), hyperparameters include the number of decision trees in the forest and the number of features considered by each tree when splitting a node. For example, the parameters of a random forest are the variables and thresholds used to split each node learned during training. In the context of the present application, a hyperparameter may correspond to one of the original fraud features 410 discussed above. In the illustrated embodiment, the hyperparameter for the node 760 is labeled as HP1. If the value of the hyperparameter HP1 for a transaction is less than a predefined threshold, such as 215.599 in the illustrated example, the transaction is sorted into the left branch and grouped into the node 761. If the value of the hyperparameter HP1 for a transaction is greater than or equal to the predefined threshold of 215.599, the transaction is sorted into the right branch and grouped into the node 762.

The transactions in the node 761 are then split into two more nodes 763 and 764 based on the value of the hyperparameter HP2. If the value of the hyperparameter HP2 for a transaction is less than a predefined threshold, such as 96.966 in the illustrated example, the transaction is sorted into the left branch and grouped into the node 763. If the value of the hyperparameter HP2 for a transaction is greater than the predefined threshold of 96.966, the transaction is sorted into the right branch and grouped into the node 764. Note that the node 763 has a value of 0, which means that it represents a decision that the transactions sorted into the node 763 are considered good transactions (regardless of whether these transactions actually are good transactions) and therefore should be accepted.

The transactions in the node 762 are then split into two more nodes 765 and 766 based on the value of the hyperparameter HP3. If the value of the hyperparameter HP3 for a transaction is less than a predefined threshold, such as 1324.0 in the illustrated example, the transaction is sorted into the left branch and grouped into the node 765. If the value of the hyperparameter HP3 for a transaction is greater than the predefined threshold of 1324.0, the transaction is sorted into the right branch and grouped into the node 766. Note that the node 766 has a value of 1, which means that it represents a decision that the transactions sorted into the node 766 are considered bad transactions (regardless of whether these transactions actually are bad transactions) and therefore should be declined.

Similarly, the transactions in the node 764 and 765 are sorted into nodes 767-768 and 769-770, respectively, based on values of hyperparameters HP4 and HP5. Again, since the values of the nodes 767 and 769-770 are 0, the decision tree model assumes that transactions sorted into the nodes 767 and 769-770 are good transactions and should be accepted. Meanwhile, since the value of the node 768 is 1, the decision tree model assumes that transactions sorted into the node 768 are bad transactions and should be declined.

The transactions in the nodes 766 and 768 (e.g., the transactions that have been identified as bad by the first level tree 750) are used as inputs for the second level tree 751. For example, the node 780 of the second level tree 751 receives the transactions from the nodes 766 and 768 of the first level tree 750. Similar to the first level tree 750, the second level tree 750 undergoes many splits to form nodes 780-796, based on hyperparameters such as HP6-HP13, etc. The second level tree 751 predicts that the nodes 783, 785, 789, 791, 793, and 795 as containing good transactions that should be accepted, and that the nodes 786, 794, and 796 as containing bad transactions that should be rejected.

One aspect of the present disclosure is that the training of the first level tree 750 is performed using a greater penalty on false negative predictions than false positive predictions. In that regard, a false negative prediction occurs when a bad transaction is mistakenly predicted as a good transaction. For example, this may occur in the first level tree 750 when a bad transaction is mistakenly sorted into the nodes 767, 769, or 770, which have been predicted to be good transactions. Thus, this false negative transaction should have been rejected/declined as a bad transaction, but it is mistakenly accepted as a good transaction. On the other hand, a false positive prediction occurs when a good transaction is mistakenly predicted as a bad transaction. For example, this may occur in the first level tree 750 when a good transaction is mistakenly sorted into the node 768, which has been predicted to be bad transactions. Thus, this false positive transaction should have been accepted as a good transaction, but it is mistakenly rejected/declined as a bad transaction.

As a part of the training, whenever the first level tree 750 or the second level tree 751 makes a wrong prediction, it is penalized. As discussed above, the first level tree 750 has a much greater penalty for predicting false negatives than the second level tree 751, for example the penalty is at least 3 times greater. The reason for this greater penalty is that the first level tree 750 is meant to have good recall or coverage of bad transactions. In other words, the first level tree 750 is meant to capture as many bad transactions as possible, at the risk of falsely predicting certain good transactions as bad transactions. In comparison, the second level tree 751 is meant to be more precise than the first level tree 750. For example, it has more levels (and therefore capable of making more complex logic decisions) than the first level tree 750, where decisions are made in each of the levels. In the embodiment shown in FIG. 7, the first level tree 750 has 4 levels, whereas the second level tree 751 has 6 levels. The relatively more complex logic of the second level tree 751 enables it to make more precise and/or accurate predictions with respect to whether a transaction is good or bad.

The training of the first level tree 750 and the second level tree 751 may involve using different combinations of hyper-parameters for the various nodes and/or different thresholds (e.g., how to split the branches) to train the same merchant group a plurality of times. As a result, different trees may be generated. To determine which tree is the best, the nodes (e.g., the nodes 786, 794, and 796) corresponding to the bad transaction predictions are identified from the second level tree 751. Ideally, all of these nodes should contain only bad transactions. However, realistically these nodes may contain mostly bad transactions but some good transactions as well (e.g., false positives). The percentage of bad transactions over the total transactions (e.g., in terms of transaction monetary amount) is calculated for these nodes each time the decision tree model is trained. The higher this percentage, the better the decision tree model is at predicting bad transactions.

Figure 6:
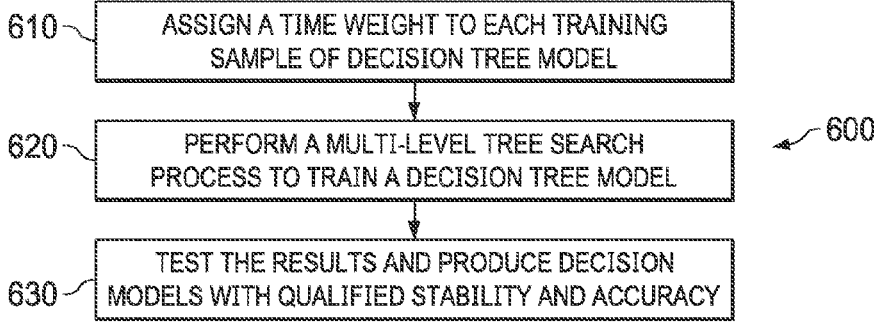
FIG. 6 is a flowchart illustrating the training of a decision tree model according to various aspects of the present disclosure.

At the end of the training, a list of qualified decision models with satisfying stability and accuracy are selected, as well as the prediction result on each merchant within the group. Such a training process may be repeated for every member of the merchant groups 260, and a customized decision tree model may be generated for every member of the merchant groups 260. Since each member of the merchant groups 260 has different innate characteristics (e.g., in terms of being susceptible to different types of fraud attacks) than other members, the customized decision model for a particular merchant group is uniquely tailored to the members of that merchant group. Also as shown in FIG. 6, the method 600 may further include a step 630 to test the results of the training and produce decision models with qualified stability and accuracy. It is understood that various aspects of the training of the decision model 270 may be performed using machine learning in some embodiments.

Referring back to FIG. 2, after the decision model 270 is trained, it may be used to provide a solution in step 280. For example, as a part of the step 280, the clustering and modeling component 200 may provide a solution to existing or prospective merchants with respect to catching fraud. During these merchants engage in transactions, the clustering and modeling component 200 may use the decision models 270 (that are customized for the particular merchant or merchant group) generated for these merchants to warn the merchants of potential attacks. In addition, as the merchants engage in transactions, the clustering and modeling component 200 may use the decision models 270 (again, customized for the particular merchant or merchant group) to determine whether the transactions are fraudulent, and whether they need to be declined or accepted. In some cases, when a transaction is predicted to involve fraud, the clustering and modeling component 200 may at least temporarily suspend the transaction until the parties involved in the transaction provide further security credentials. It is understood that the clustering and modeling component 200 may provide the solution in step 280 to each merchant individually in some embodiments, or it may provide the solution in step 280 to a merchant group in other embodiments. Optionally, the step 280 may be run in a testing environment for a predefined period (e.g., 30 days) before it is deployed in a production environment.

Figure 8:
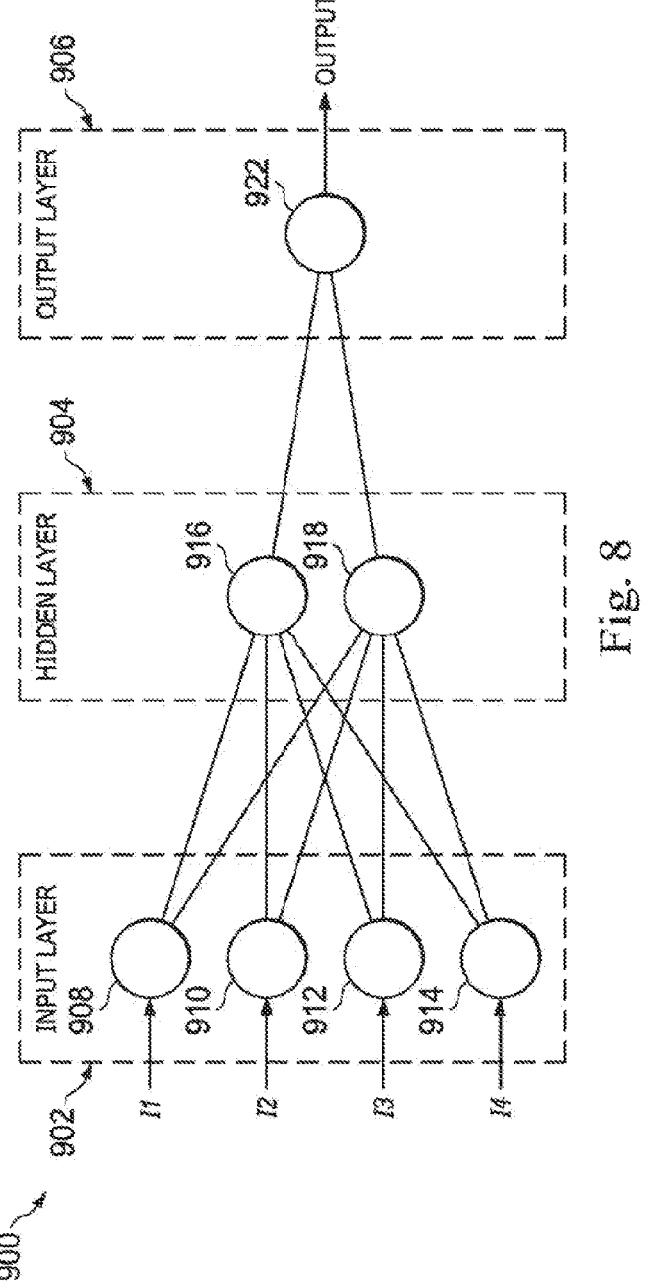
FIG. 8 is a simplified example of an example artificial neural network according to various aspects of the present disclosure.

It is understood that machine learning may be used to refine the various aspects of the clustering and modeling component 200. For example, machine learning may be used to generate the bad-transaction tags based on the weighted new features or to train the decision models, as discussed above in association with FIGS. 3 and 6. In some embodiments, the machine learning may be performed at least in part via an artificial neural network. In that regard, FIG. 8 illustrates an example artificial neural network 900. As shown, the artificial neural network 900 includes three layers—an input layer 902, a hidden layer 904, and an output layer 906. Each of the layers 902, 904, and 906 may include one or more nodes. For example, the input layer 902 includes nodes 908-914, the hidden layer 904 includes nodes 916-918, and the output layer 906 includes a node 922. In this example, each node in a layer is connected to every node in an adjacent layer. For example, the node 908 in the input layer 902 is connected to both of the nodes 916-918 in the hidden layer 904. Similarly, the node 916 in the hidden layer is connected to all of the nodes 908-914 in the input layer 902 and the node 922 in the output layer 906. Although only one hidden layer is shown for the artificial neural network 900, it has been contemplated that the artificial neural network 900 used to implement the clustering and modeling component 200, and the clustering and modeling component 200 may include as many hidden layers as necessary.

In this example, the artificial neural network 900 receives a set of input values and produces an output value. Each node in the input layer 902 may correspond to a distinct input value. For example, when the artificial neural network 900 is used to generate the bad-transaction tags based on the weighted new features (e.g., the transformed fraud features), each node in the input layer 902 may correspond to a distinct weighted new features.

In some embodiments, each of the nodes 916-918 in the hidden layer 904 generates a representation, which may include a mathematical computation (or algorithm) that produces a value based on the input values received from the nodes 908-914. The mathematical computation may include assigning different weights to each of the data values received from the nodes 908-914. The nodes 916 and 918 may include different algorithms and/or different weights assigned to the data variables from the nodes 908-914 such that each of the nodes 916-918 may produce a different value based on the same input values received from the nodes 908-914. In some embodiments, the weights that are initially assigned to the features (or input values) for each of the nodes 916-918 may be randomly generated (e.g., using a computer randomizer). The values generated by the nodes 916 and 918 may be used by the node 922 in the output layer 906 to produce an output value for the artificial neural network 900. When the artificial neural network 900 is used to implement the clustering and modeling component 200, the output value produced by the artificial neural network 900 may indicate a likelihood of an event (e.g., a transaction being fraudulent).

The artificial neural network 900 may be trained by using training data. For example, the training data here may include data that involve known fraudulent transactions and/or entities and the fraud features associated therewith. By providing training data to the artificial neural network 900, the nodes 916-918 in the hidden layer 904 may be trained (adjusted) such that an optimal output (e.g., determining a value for a threshold) is produced in the output layer 906 based on the training data. By continuously providing different sets of training data, and penalizing the artificial neural network 900 when the output of the artificial neural network 900 is incorrect (e.g., when the determined (predicted) likelihood is inconsistent with whether the event actually occurred for the transaction, etc.), the artificial neural network 900 (and specifically, the representations of the nodes in the hidden layer 904) may be trained (adjusted) to improve its performance in data classification. Adjusting the artificial neural network 900 may include adjusting the weights associated with each node in the hidden layer 904.

Although the above discussions pertain to an artificial neural network as an example of machine learning, it is understood that other types of machine learning methods may also be suitable to implement the various aspects of the present disclosure. For example, support vector machines (SVMs) may be used to implement machine learning. SVMs are a set of related supervised learning methods used for classification and regression. A SVM training algorithm—which may be a non-probabilistic binary linear classifier—may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable. Other types of machine learning algorithms are not discussed in detail here for reasons of simplicity.

FIG. 9 is a flowchart illustrating a method 1100 for clustering merchants and for training decision models. The various steps, details of which are discussed here and not repeated below for conciseness, of the method 1100 may be performed by one or more electronic processors, for example by the processors of a computer of an entity that may include: a payment provider, a business analyst, or a merchant. In some embodiments, at least some of the steps of the method 1100 may be performed by the clustering and modeling component 200 discussed above.

The method 1100 includes a step 1110 to access an electronic database storing historical merchant transaction data.

The method 1100 includes a step 1120 to identify, based on the accessing, a plurality of merchants having fraud risks that are above a predefined threshold, wherein the plurality of merchants is associated with a vector of fraud features.

The method 1100 includes a step 1130 to divide, based on characteristics of the merchants, the plurality of merchants into a plurality of merchant pools.

The method 1100 includes a step 1140 to determine, for each of the merchant pools of the plurality of merchant pools, a weight matrix for the vector of fraud features.

The method 1100 includes a step 1150 to calculate, for each of the merchant pools of the plurality of merchant pools, a numerical product as a function of the vector of fraud features and the weight matrix.

The method 1100 includes a step 1160 to perform, for each of the merchant pools of the plurality of merchant pools, a machine learning process using the calculated numerical product.

The method 1100 includes a step 1170 to generate, for each of the merchant pools of the plurality of merchant pools and based on the machine learning process, a plurality of bad-transaction tags.

The method 1100 includes a step 1180 to determine a plurality of merchant groups based on the bad-transaction tags.

The method 1100 includes a step 1190 to train, for each of the merchant groups, a respective multi-level decision tree model.

The method 1100 includes a step 1200 to predict, using the trained multi-level decision tree model, transaction fraud risks for future transactions associated with the merchants of each of the merchant groups.

In some embodiments, the characteristics of the merchants comprise: geographical location, online presence, business size, or business type. In some embodiments, the merchants in a same merchant pool share at least one of the characteristics.

In some embodiments, the determining the weight matrix comprises a gradient descent process.

In some embodiments, the calculating the numerical product further comprises calculating weighted new features of the vector of fraud features and the weight matrix.

In some embodiments, the determining the plurality of merchant groups further comprises applying a K-means clustering process. In some embodiments, the determining the plurality of merchant groups further comprises: assigning the bad-transaction tags to bad transactions conducted by merchants in each of the merchant pools; and grouping the merchants having shared bad-transaction tags into a same merchant group.

In some embodiments, the training comprises using transactions corresponding to each of the merchant groups as training data for the respective multi-level decision tree model of that merchant group. In some embodiments, the training further comprises: sorting the transactions corresponding to each of the merchant groups in a chronological order; and assigning greater weights to more recent transactions in the chronological order. In some embodiments, the training comprises: training a first tree model using the training data as an input of the first tree model, the first tree model producing a first group of outputs as presumptively good transactions that should be accepted and a second group of outputs as presumptively bad transactions that should be declined; and training a second tree model using the second group of outputs as an input of the second tree model, the second tree model producing a third group of outputs as presumptively good transactions that should be accepted and a fourth group of outputs as presumptively bad transactions that should be declined. In some embodiments, the training further comprises: applying a greater penalty to the first tree model than to the second tree model in response to a bad transaction being falsely identified as a presumptively good transaction; and applying a greater penalty to the second tree model than to the first tree model in response to a good transaction being falsely identified as a presumptively bad transaction. In some embodiments, the predicting comprises accepting or declining the future transactions based on the third group and the fourth group of outputs of the trained second tree model.

It is understood that additional method steps may be performed before, during, or after the steps 1110-1200 discussed above. For example, the method 1100 may include a step to display the result of the predicted transaction fraud risks via a screen of a device. As another example, the method 1100 may include a step to export the predicted transaction fraud risks to a data processing tool for further analysis. For reasons of simplicity, other additional steps are not discussed in detail here.

Figure 10:
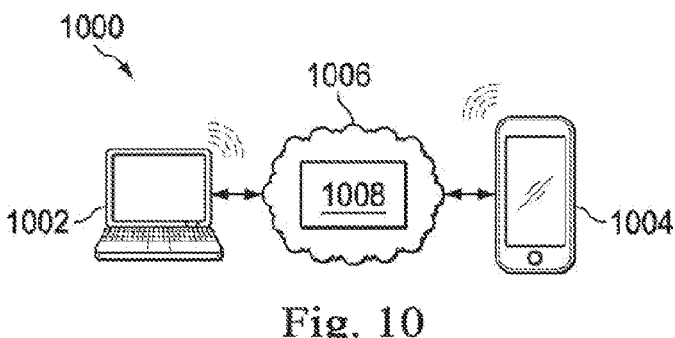
FIG. 10 is a simplified example of a cloud-based computing architecture according to various aspects of the present disclosure.

FIG. 10 illustrates an example cloud-based computing architecture 1000, which may also be used to implement various aspects of the present disclosure. The cloud-based computing architecture 1000 includes a mobile device 1004 (e.g., the user device 110 of FIG. 1) and a computer 1002 (e.g., the merchant server 140 or the payment provider server 170), both connected to a computer network 1006

(e.g., the Internet or an intranet). In one example, a consumer has the mobile device 1004 that is in communication with cloud-based resources 1008, which may include one or more computers, such as server computers, with adequate memory resources to handle requests from a variety of users. A given embodiment may divide up the functionality between the mobile device 1004 and the cloud-based resources 1008 in any appropriate manner. For example, an app on mobile device 1004 may perform basic input/output interactions with the user, but a majority of the processing may be performed by the cloud-based resources 1008. However, other divisions of responsibility are also possible in various embodiments. In some embodiments, using this cloud architecture, the clustering and modeling component 200 may reside on the merchant server 140 or the payment provider server 170, but its functionalities can be accessed or utilized by the mobile device 1004, or vice versa.

The cloud-based computing architecture 1000 also includes the personal computer 1002 in communication with the cloud-based resources 1008. In one example, a participating merchant or consumer/user may access information from the cloud-based resources 1008 by logging on to a merchant account or a user account at computer 1002. The system and method for using machine learning to cluster the merchants and to train the decision models as discussed above may be implemented at least in part based on the cloud-based computing architecture 1000.

It is understood that the various components of cloud-based computing architecture 1000 are shown as examples only. For instance, a given user may access the cloud-based resources 1008 by a number of devices, not all of the devices being mobile devices. Similarly, a merchant or another user may access the cloud-based resources 1008 from any number of suitable mobile or non-mobile devices. Furthermore, the cloud-based resources 1008 may accommodate many merchants and users in various embodiments.

Figure 11:
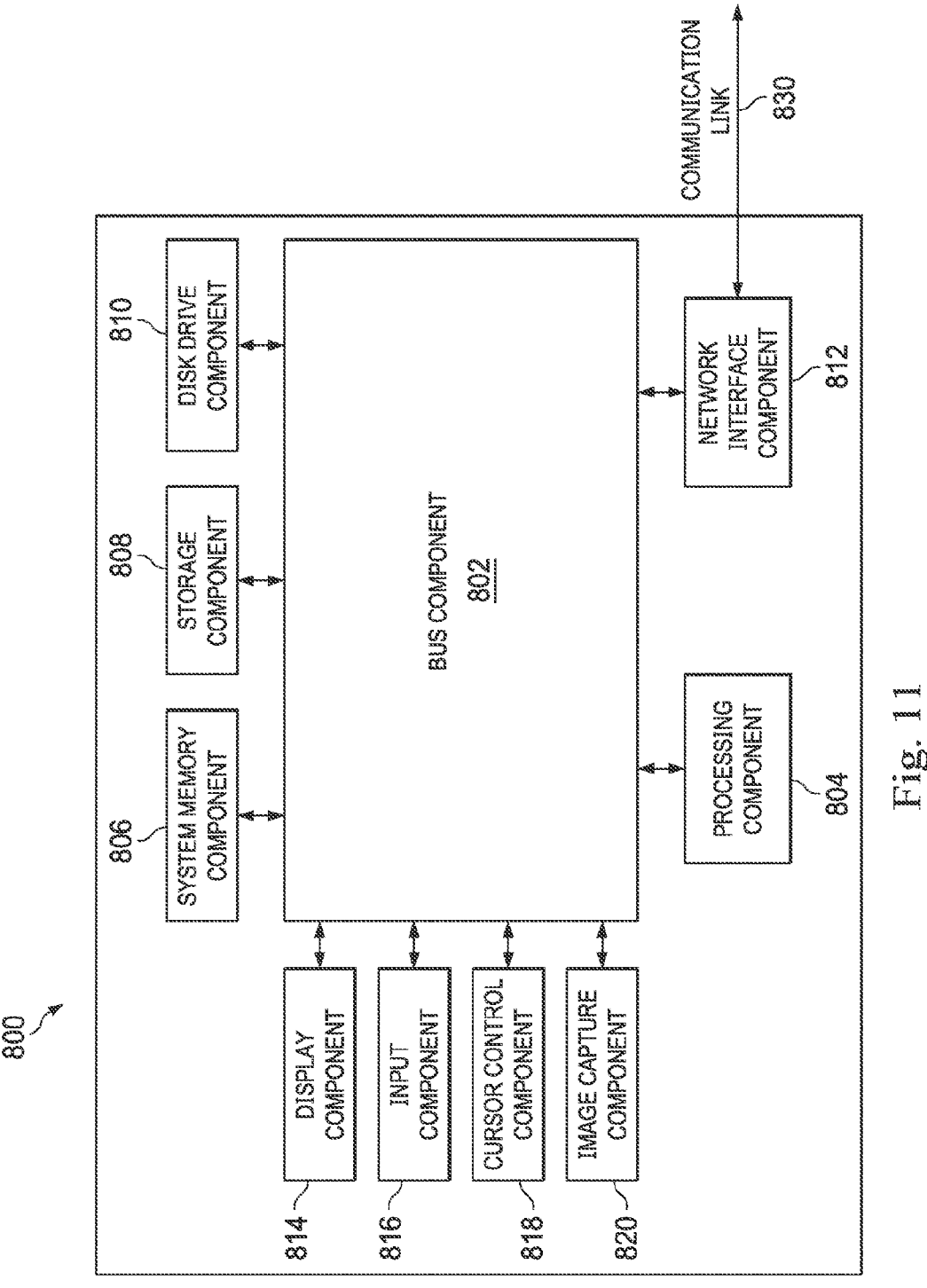
FIG. 11 is an example computer system for implementing the various steps of the methods of FIGS. 3, 6, and 9 according to various aspects of the present disclosure.

FIG. 11 is a block diagram of a computer system 800 suitable for implementing various methods and devices described here, for example, the clustering and modeling component 200, the rest of the payment provider server 170, the user device 110, or the merchant server 140. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the clustering and modeling component 200 and the various method steps of the method 1100 discussed above (or the user device 110, the merchant server 140, or the payment provider server 170) may be implemented as the computer system 800 in a manner as follows.

In accordance with various embodiments of the present disclosure, the computer system 800, such as a network server or a mobile communications device, includes a bus component 802 or other communication mechanisms for communicating information, which interconnects subsystems and components, such as a computer processing component 804 (e.g., processor, micro-controller, digital signal processor (DSP), etc.), system memory component 806 (e.g., RAM), static storage component 808 (e.g., ROM), disk drive component 810 (e.g., magnetic or optical), network interface component 812 (e.g., modem or Ethernet card), display component 814 (e.g., cathode ray tube (CRT) or liquid crystal display (LCD)), input component 816 (e.g., keyboard), cursor control component 818 (e.g., mouse or trackball), and image capture component 820 (e.g., analog or digital camera). In one implementation, disk drive component 810 may comprise a database having one or more disk drive components.

In accordance with embodiments of the present disclosure, computer system 800 performs specific operations by the processor 804 executing one or more sequences of one or more instructions contained in system memory component 806. Such instructions may be read into system memory component 806 from another computer readable medium, such as static storage component 808 or disk drive component 810. In other embodiments, hard-wired circuitry may be used in place of (or in combination with) software instructions to implement the present disclosure. In some embodiments, the various components of the clustering and modeling component 200 may be in the form of software instructions that can be executed by the processor 804 to automatically perform context-appropriate tasks on behalf of a user.

Logic may be encoded in a computer readable medium, which may refer to any medium that participates in providing instructions to the processor 804 for execution. Such a medium may take many forms, including but not limited to, non-volatile media and volatile media. In one embodiment, the computer readable medium is non-transitory. In various implementations, non-volatile media includes optical or magnetic disks, such as disk drive component 810, and volatile media includes dynamic memory, such as system memory component 806. In one aspect, data and information related to execution instructions may be transmitted to computer system 800 via a transmission media, such as in the form of acoustic or light waves, including those generated during radio wave and infrared data communications. In various implementations, transmission media may include coaxial cables, copper wire, and fiber optics, including wires that comprise bus 802.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the programming code for the clustering and modeling component 200 discussed above.

In various embodiments of the present disclosure, execution of instruction sequences to practice the present disclosure may be performed by computer system 800. In various other embodiments of the present disclosure, a plurality of computer systems 800 coupled by communication link 830 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 800 may transmit and receive messages, data, information and instructions, including one or more programs (i.e., application code) through communication link 830 and communication interface 812. Received program code may be executed by computer processor 804 as received and/or stored in disk drive component 810 or some other non-volatile storage component for execution. The communication link 830 and/or the communication interface 812 may be used to conduct electronic communications between the clustering and modeling component 200 and external devices, for example with the user device 110, with the merchant server 140, or with the payment provider server 170, depending on exactly where the clustering and modeling component 200 is implemented.

Where applicable, various embodiments provided by the present disclosure may be implemented using hardware, software, or combinations of hardware and software. Also, where applicable, the various hardware components and/or software components set forth here may be combined into composite components comprising software, hardware, and/or both without departing from the spirit of the present disclosure. Where applicable, the various hardware components and/or software components set forth here may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified here may be implemented using one or more general purpose or specific purpose computers and/or computer systems, networked and/or otherwise. Where applicable, the ordering of various steps described here may be changed, combined into composite steps, and/or separated into sub-steps to provide features described here. It is understood that at least a portion of the clustering and modeling component 200 may be implemented as such software code.

Based on the above discussions, it can be seen that the present disclosure offers several significant advantages over conventional methods and systems. It is understood, however, that not all advantages are necessarily discussed in detail here, different embodiments may offer different advantages, and that no particular advantage is required for all embodiments. One advantage is improved functionality of a computer. For example, conventional computer systems may only be able to catch or predict fraud involved in electronic transactions with sufficient accuracy or speed. Conventional computer systems may also be limited in terms of providing a customized solution for a merchant, as it often utilizes a one-size-fits-all approach. In contrast, the computer system of the present disclosure can link different types of fraud with not just the external characteristics (e.g., geographical location, size, industry, etc.) of merchants, but their inner characteristics and vulnerabilities. This is achieved via a transformation of the fraud features using a weight matrix and subsequently applying machine learning to the transformed fraud features, so that the underlying relationships between the fraud and the inner characteristics and/or circumstances can be identified. This allows the grouping of merchants with similar problems with respect to fraudulent attacks. A multi-level decision tree model is then trained to find the best solution for addressing fraud for each merchant group. As such, the solution is uniquely tailored to each merchant group (or to each merchant), which is much more effective in forecasting, preventing, and/or mitigating fraud. Therefore, the present disclosure improves computer functionality by turning an ordinary computer into a versatile tool in fraud prediction and prevention. As another example of the improved computer functionality, the computer system here utilizes machine learning to implement the merchant clustering and/or the decision tree modeling. This allows the computer system here to achieve a speedy and yet accurate result in the fraud prediction and prevention, which is something that would not have been possible using conventional computers.

The inventive ideas of the present disclosure are also integrated into a practical application, for example into the clustering and modeling component 200 discussed above. Such a practical application can generate a custom solution for each merchant or merchant group, and it can significantly reduce costs related to fraud-related attacks on merchants.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method that includes the following steps: accessing an electronic database storing historical merchant transaction data; identifying, based on the accessing, a plurality of merchants having fraud risks that are above a predefined threshold, wherein the plurality of merchants are associated with a vector of fraud features; dividing, based on characteristics of the merchants, the plurality of merchants into a plurality of merchant pools; determining, for each of the merchant pools of the plurality of merchant pools, a weight matrix for the vector of fraud features; calculating, for each of the merchant pools of the plurality of merchant pools, weighted new features as a function of the vector of fraud features and the weight matrix; performing, for each of the merchant pools of the plurality of merchant pools, a machine learning process using the weighted new features; generating, for each of the merchant pools of the plurality of merchant pools and based on the machine learning process, a plurality of bad-transaction tags; determining a plurality of merchant groups based on the bad-transaction tags; training, for each of the merchant groups, a respective multi-level decision tree model; and predicting, using the trained multi-level decision tree model, transaction fraud risks for future transactions associated with the merchants of each of the merchant groups.

Another aspect of the present disclosure involves a system that includes a non-transitory memory and one or more hardware processors coupled to the non-transitory memory and configured to read instructions from the non-transitory memory to cause the system to perform operations comprising: determining a plurality of fraud features for a plurality of merchants; training a weight matrix for the plurality of fraud features through a gradient descent process; transforming the plurality of fraud features via this weight matrix; applying an unsupervised machine learning process to the transformed plurality of fraud features; generating, based on the unsupervised machine learning process, a plurality of tags that correspond to different types of transaction fraud, respectively; clustering the plurality of merchants into a plurality of different merchant groups based on the tags; training, for each of the merchant groups, a respective decision tree model, wherein the training comprises: training a first level tree with transactions from said merchant group, and training a second level tree with an output of the first level tree, wherein the first level tree is trained with a greater emphasis on coverage of potentially fraudulent transactions than the second level tree, and wherein the second level tree is trained with a greater emphasis on precision of identifying fraudulent transactions than the first level tree; and processing transactions associated with each of the merchant groups at least in part by using the decision tree model trained for said merchant group.

Yet another aspect of the present disclosure involves a non-transitory machine-readable medium having stored thereon machine-readable instructions executable to cause a machine to perform operations comprising: identifying a vector of fraud features that are associated with a plurality of merchants; training a weight matrix that contains a plurality of weight coefficients for the vector of fraud features, wherein the training comprises calculating probabilities of fraud using a gradient descent process; calculating weighted new features through the vector of fraud features and the trained weight matrix; applying an unsupervised machine learning process on the weighted new features; generating a plurality of transaction tags based on the applying, the plurality of transaction tags each corresponding to a correlation between fraud and a set of values associated with the vector of fraud features; dividing the plurality of merchants into a plurality of merchant pools, each merchant pool being associated with a respective one of the transaction tags; training, for each of the merchant pools, a decision tree model, wherein the training of the decision tree model further comprises: training a first level tree of the decision tree model with transactions of each of the merchant pools as an input; and training a second level tree of the decision tree model with an output of the first level tree as an input of the second level tree, and wherein the second level tree has more complex logic than the first level tree; and processing future transactions of the merchant pools at least in part based on respective decision tree models that are trained for the merchant pools, wherein the processing comprises using the decision tree models to detect fraud and declining transactions where fraud has been detected.

The foregoing disclosure is not intended to limit the present disclosure to the precise forms or particular fields of use disclosed. As such, it is contemplated that various alternate embodiments and/or modifications to the present disclosure, whether explicitly described or implied here, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:

accessing an electronic database storing historical merchant transaction data;

identifying, based on the accessing, a plurality of merchants having fraud risks that are above a predefined threshold, wherein the plurality of merchants are associated with a vector of fraud features;

dividing, based on characteristics of the plurality of merchants, the plurality of merchants into a plurality of merchant pools;

generating, for each of the merchant pools of the plurality of merchant pools and using a gradient descent method, a weight matrix for the vector of fraud features, wherein the weight matrix comprises a first number of rows and a second number of columns, the first number of rows corresponding to a number of fraud features in the vector of fraud features, the second number of columns corresponding to a total number of different types of transactions associated with the historical merchant transaction data;

calculating, for each of the merchant pools of the plurality of merchant pools, weighted new features at least in part by multiplying the vector of fraud features with the weight matrix;

performing, on each of the merchant pools of the plurality of merchant pools, a machine learning process using the weighted new features;

generating, for each of the merchant pools of the plurality of merchant pools and based on performing the machine learning process, a plurality of bad-transaction tags, wherein the plurality of bad-transaction tags are machine-generated and each corresponds to a hidden correlation between fraud and a specific combination of the fraud features;

determining a plurality of merchant groups based on the bad-transaction tags, wherein each merchant group of the plurality of merchant groups has a corresponding bad-transaction tag of the plurality of bad-transaction tags;

training, for each of the plurality of merchant groups, a respective multi-level decision tree model, wherein each of the respective multi-level decision tree models includes a first level tree model and a second level tree model, wherein an output of a training of the first level tree model is used as input to train the second level tree model, and wherein the first level tree model is trained using a greater penalty on false negative predictions than false positive predictions; and predicting, using the trained multi-level decision tree models, transaction fraud risks for future transactions associated with the plurality of merchants of each of the plurality of merchant groups, wherein the accessing, the identifying, the dividing, the generating the weight matrix, the calculating, the performing, the generating, the determining the plurality of merchant groups, the training, and the predicting are performed at least in part by one or more computers containing one or more hardware processors.

2. The method of claim 1, wherein:

the characteristics comprise: a geographical location, an online presence, a business size, or a business type; and the plurality of merchants in a same merchant pool share at least one of the characteristics.

3. The method of claim 1, wherein at least a first subset of the plurality of merchants each have a dominant bad-transaction tag, respectively, and wherein at least a second subset of the plurality of merchants lack any dominant bad-transaction tag.

4. The method of claim 3, wherein the machine learning process is a first machine learning process, and wherein the method further comprises:

performing a second machine learning process for the second subset of the plurality of merchants, wherein the second machine learning process comprises a clustering process; and grouping, based on performing the second machine learning process, the merchants in the second subset of the plurality of merchants into different ones of the plurality of merchant groups.

5. The method of claim 1, wherein the multiplying generates a product of the vector of fraud features and mean values of the weight matrix.

6. The method of claim 1, wherein the determining the plurality of merchant groups further comprises applying a K-means clustering process.

7. The method of claim 1, wherein: the determining the plurality of merchant groups further comprises:

assigning the bad-transaction tags to bad transactions conducted by merchants in each of the merchant pools; and grouping the merchants having shared bad-transaction tags into a same merchant group.

8. The method of claim 1, wherein the training comprises using transactions corresponding to each of the plurality of merchant groups as training data for the respective multi-level decision tree model of that merchant group.

9. The method of claim 8, wherein the training further comprises:

sorting the transactions corresponding to each of the plurality of merchant groups in a chronological order; and assigning greater weights to more recent transactions in the chronological order.

10. The method of claim 8, wherein the training further comprises:

training the first level tree model using the training data as an input of the first level tree model, the first level tree model producing a first group of outputs as presumptively good transactions that should be accepted and a second group of outputs as presumptively bad transactions that should be declined; and training the second level tree model using the second group of outputs as an input of the second level tree model, the second level tree model producing a third group of outputs as presumptively good transactions that should be accepted and a fourth group of outputs as presumptively bad transactions that should be declined.

11. The method of claim 10, wherein the training further comprises:

applying a greater penalty to the second level tree model than to the first level tree model in response to a good transaction being falsely identified as a presumptively bad transaction.

12. The method of claim 10, wherein the predicting comprises accepting or declining the future transactions based on the third group and the fourth group of outputs of the trained second level tree model.

13. A system, comprising:

a non-transitory memory; and one or more hardware processors coupled to the non-transitory memory and configured to read instructions from the non-transitory memory to cause the system to perform operations comprising:

determining a plurality of fraud features for a plurality of merchants, the plurality of fraud features associated with a plurality of transactions involving the plurality of merchants;

training a weight matrix of coefficients for the plurality of fraud features, the weight matrix comprising a plurality of rows corresponding to a total number of the plurality of fraud features and a plurality of columns corresponding to a total number of different transaction types in the plurality of transactions;

transforming the plurality of fraud features at least in part by weighting the plurality of fraud features with the weight matrix of coefficients;

applying an unsupervised machine learning process to the transformed plurality of fraud features;

generating, based on applying the unsupervised machine learning process, a plurality of tags that correspond to different types of transaction fraud, respectively, wherein the plurality of tags are generated without direct human input, and wherein each of the tags in the plurality of tags corresponds to a correlation between a specific type of fraud and a set of circumstances or conditions involving one or more merchants of the plurality of merchants;

clustering the plurality of merchants into a plurality of different merchant groups based on the tags, such that each merchant group of the plurality of different merchant groups has a corresponding tag of the plurality of tags;

training, for each of the plurality of merchant groups, a respective decision tree model, wherein the training comprises: training a first level tree with transactions from said merchant group, and training a second level tree with an output of the first level tree, wherein the first level tree is trained with a greater emphasis on coverage of potentially fraudulent transactions than the second level tree, and wherein the second level tree is trained with a greater emphasis on precision of identifying fraudulent transactions than the first level tree; and processing transactions associated with each of the plurality of merchant groups at least in part by using the decision tree model trained for said merchant group.

14. The system of claim 13, wherein the determining the fraud features comprises determining the fraud features from merchants that share similarities with respect to a geographical location, an online presence, a business size, or a business type.

15. The system of claim 13, wherein the training the weight matrix is obtained at least in part via a gradient descent process.

16. The system of claim 13, wherein the plurality of fraud features is in a form of a vector, and wherein the transforming the plurality of fraud features comprises multiplying the vector with the weight matrix of coefficients.

17. The system of claim 13, wherein:

the training of the first level tree further comprises using chronologically sorted and weighted transactions from said merchant group as training samples; and the second level tree has more branches than the first level tree.

18. A non-transitory machine-readable medium having stored thereon machine-readable instructions executable to cause a machine to perform operations comprising:

identifying a vector of fraud features that are associated with a plurality of transactions conducted at least in part by a plurality of merchants;

training a weight matrix that contains a plurality of weight coefficients for the vector of fraud features, wherein the weight matrix comprises a first number of rows and a second number of columns, the first number of rows corresponding to a number of fraud features in the vector of fraud features, the second number of columns corresponding to a total number of different types of transactions associated with the plurality of transactions, and wherein the training comprises calculating probabilities of fraud using a gradient descent;

calculating weighted new features at least in part by multiplying the vector of fraud features and the trained weight matrix;

applying an unsupervised machine learning process on the weighted new features;

machine-generating a plurality of transaction tags based on the applying, the plurality of transaction tags each corresponding to a correlation between a specific type of fraud and a set of values associated with the vector of fraud features;

dividing the plurality of merchants into a plurality of merchant pools, each merchant pool being associated with a respective one of the transaction tags;

training, for each of the merchant pools, a decision tree
model, wherein the training of the decision tree model
further comprises:

training a first level tree of the decision tree model with
transactions of each of the merchant pools as an
input;

training a second level tree of the decision tree model
with an output of the first level tree as an input of the
second level tree, and wherein the second level tree
has more branches than the first level tree;

applying a greater penalty, to the first level tree than the
second level tree, when a fraudulent transaction is
mistakenly predicted as a non-fraudulent transaction;
and applying a greater penalty, to the second level tree than
the first level tree, when a non-fraudulent transaction
is mistakenly predicted as a fraudulent transaction;
and processing future transactions of the merchant pools at
least in part based on respective decision tree models that are trained for the merchant pools, wherein the
processing comprises using the decision tree models to
detect fraud and declining transactions where fraud has
been detected.

19. The non-transitory machine-readable medium of
claim 18, wherein the dividing comprises applying a
K-means clustering process to group at least some of the
merchants into a same merchant pool.

20. The non-transitory machine-readable medium of
claim 18, wherein:

the training the first level tree generates a first group of
outputs as presumptively good transactions that should
be accepted and a second group of outputs as presump-
tively bad transactions that should be declined; and the training the second level tree model generates a third
group of outputs as presumptively good transactions
that should be accepted and a fourth group of outputs
as presumptively bad transactions that should be
declined.

* * * * *